United States Patent [19]

Siebertz et al.

[11] Patent Number: 4,543,143
[45] Date of Patent: Sep. 24, 1985

[54] PROCESS AND APPARATUS FOR THE COVERING OF PLAYING BALLS

[75] Inventors: Dietmar Siebertz, Am Heinichenberg 9, D-6454 Bruchkoebel 1, Fed. Rep. of Germany; Stephan Siebertz, Troisdorf, Fed. Rep. of Germany

[73] Assignee: Dietmar Siebertz, Fed. Rep. of Germany

[21] Appl. No.: 666,121

[22] Filed: Oct. 29, 1984

Related U.S. Application Data

[63] Continuation of Ser. No. 436,295, Oct. 25, 1982, abandoned.

[30] Foreign Application Priority Data

Oct. 23, 1981 [DE] Fed. Rep. of Germany ....... 3142065
Jul. 29, 1982 [DE] Fed. Rep. of Germany ....... 3228341

[51] Int. Cl.[4] .............................................. B29C 17/04
[52] U.S. Cl. .................... 156/213; 156/447; 156/451; 156/453; 156/564; 156/573; 198/606; 221/81; 222/221
[58] Field of Search ............... 156/186, 213, 446–449, 156/451, 453, 455, 564; 53/176, 216; 221/81, 79, 80, 224, 233, 259, 261, 273; 196/605, 606, 834; 222/221, 216, 342

[56] References Cited

U.S. PATENT DOCUMENTS

| 1,048,092 | 12/1912 | Perry | 156/213 |
| 1,117,129 | 11/1914 | Giroud | 53/176 |
| 1,117,130 | 11/1914 | Giroud | 53/176 |
| 1,435,680 | 11/1922 | Adamson | 156/453 |
| 1,706,384 | 3/1929 | Gesauman | 156/446 |
| 2,045,287 | 6/1936 | Bardet et al. | 156/453 |
| 2,299,544 | 10/1942 | Humphrey | 156/213 |
| 2,509,528 | 5/1950 | Roberts | 156/449 |
| 3,690,435 | 9/1972 | King | 198/606 |
| 4,017,003 | 4/1977 | Heino | 221/81 |
| 4,194,941 | 3/1980 | Briggs et al. | 156/449 |

Primary Examiner—Jerome Massie
Attorney, Agent, or Firm—Robert J. Koch

[57] ABSTRACT

A process and apparatus for the covering of playing balls, in particular tennis balls, utilize two essentially dumbbell-shaped cover parts and apply the parts interlockingly at an angle of 90°, successively to the adhesive coated ball core by rolling over the laid out, dumbbell-shaped cover parts. The cover parts are stacked to form a magazine and are provided with a layer of an adhesive so that only their peripheral surfaces are coated. The adhesive coated ball cores are rolled successively, initially by means of a contact pressure device in the longitudinal direction over a first cover part magazine and subsequently by means of a second contact pressure device and second cover part magazine extending transversely to the longitudinal direction of the first cover part magazine. The edge of the second cover part engages the bight of the cover part already in position at a decorative seam gap.

13 Claims, 5 Drawing Figures

PROCESS AND APPARATUS FOR THE COVERING OF PLAYING BALLS

This application is a continuation of application Ser. No. 436,295, filed Oct. 25, 1982, now abandoned.

BACKGROUND OF THE INVENTION

1. Field of the Invention

The invention concerns a process and apparatus for the fitting of playing balls with a cover, wherein two separately dumbell-shaped cover parts are applied interlockingly at an angle of 90° successively by rolling the core of the ball over the laid out, dumbbell-shaped cover parts. More particularly, the process and apparatus relate to the covering of playing balls, such as tennis balls.

2. Background of the Invention

An apparatus for the covering of playing balls, especially tennis balls, is known from U.S. Pat. No. 2,509,528. It consists of a revolving table with a total of six, essentially similar work tables, into which in each case, two cover parts and a ball core are inserted manually and which are arrested successively at five workheads. The different rolling steps for the pressing of the cover to the core of the ball are effected at each workhead in a cyclic manner. This apparatus represents an extraordinarily costly device from a design standpoint. In spite of the substantial outlay only a partially automatic working process is obtained, since both cover parts and the core of the ball must be inserted manually in the apparatus and since only one ball is completed during each revolution of the work table.

SUMMARY OF THE INVENTION

An object of the present invention is to provide a process and an apparatus for the covering of playing balls, whereby with a significantly reduced equipment layout and the fully automatic covering of playing balls, in particular tennis balls, is obtained.

The process of the invention comprises stacking dumbbell-shaped cover members in two separate magazines, applying adhesive to the peripheral surfaces of the cover members, rolling ball cores successively over the first of the magazines along a path including the length of the cover members and for a distance equal to one and one-fourth times the length of the cover member to apply a first cover member to each ball core, and rolling the ball cores after the preceding step in a direction transverse to the path for a distance equal to about three-fourths the circumference of each ball. In specific embodiments the process includes stacking a plurality of cover parts into a magazine and applying a layer of glue to the cover members by immersing the magazine of stacked cover members into an adhesive bath so that the cover parts are covered with glue only at their circumferential surfaces. The ball cores may also be glue covered balls which are rolled initially by means of a first pressure device in the longitudinal direction over the magazine. Beginning with the contact with the uppermost cover part, the ball core is travelling over a distance corresponding to the length of the cover part and one-half of the intermediate gap. At the end of the distance, this ball core is rolled further by means of a second pressure device over a blind path corresponding to one-half of the circumference of the ball and one-half of the intermediate gap and extending transversely to the first pressure path and subsequently, over a further cover part magazine.

The invention also provides a process for the covering of playing balls, in particular tennis balls, whereby the covering may be effected in an on-line operation in a fully automatic manner without the need for manual handling. The insertion of the cover parts individually into the covering apparatus required, in the case of the known devices, is eliminated. Also eliminated is the conventional insertion of the ball core into the position necessary for the adhesive bonding. The covering operation is effected in a two-phase working process, wherein the complete covering of the ball core with a cover layer, as preparation for the subsequent vulcanizing step, is attained.

The apparatus according to the invention comprises a work surface, a first rolling line onthe work surface, a second rolling line on the work surface at an angle of 90° to the first work surface, an opening in the work surface at each of the rolling lines, a magazine arranged in each of the openings, the magazine holding a plurality of cover members, means for successively lifting the contents of each magazine into the rolling line a distance equal to the thickness of one cover member and means for guiding the ball cores to be covered along the first and second rolling lines. The guiding means includes in one embodiment two slide members having a ball guide groove therein. The first slide member is arranged along the first rolling line and the second slide member arranged along the second rolling line. The intersection of the slide members is at a distance suitable for application of two cover members to the ball core.

In a successively operated embodiment, the apparatus of the invention comprises a flat work table with two coating lines arranged at right angles to each other for the ball cores with a recess corresponding in size to that of the cover parts being provided in the covering lines.

A pressuring and advancing device comprising two slides guided into each other at an angle of 90° and equipped with a ball guide groove is arranged over the lines. The dimensions and movements of the slides are correlated with each other and the position of the recesses so that the ball core is rolled initially by the first slide over the first magazine and then transferred by a further advance over a distance corresponding to one-half of the gap between covers to the slide travelling in a transverse direction to the first slide. In this fashion, the partially covered ball core is rolled over the second magazine by means of the movement of the second slide in the first slide, which is being held in its terminal positions. The front edge thereof is located at a distance corresponding approximately to three-fourths of the circumference of the ball core from the transfer line, so that the front edge of the cover part engages the bight of the cover part already in place with a visible seam gap.

With the aid of this structurally extraordinarily simple apparatus merely consisting of a roll table, a lifting device and a pressure and advance device formed by two slides running 90° to each other, the covering of playing balls may be effected in a fully automatic, cyclic operation wherein a playing ball is completely covered within each work cycle including only two work phases. In the process, the positioning of not only the cover parts, but of the ball cores itself may be effected fully automatically by means of hopper or belt input means or any other appropriate transport device. At the outlet of the transparent device, the balls are placed individually by means of a lifting device in a cyclic operation from below in contact with a feeder line of the first slide. The movement transfers the ball core to the roll table and into the covering line. An apparatus of this type may consist of a conveyor belt with cups open in the downward direction for the glue covered ball cores together with a lifting disk under the first pressure device, whereby the ball cores are lifted individually by the feeder conveyor belt into contact with the pressure device.

In another embodiment of the invention, the covering apparatus consists of a covering table with two covering lines and a recess in each of the covering lines corresponding to the configuration of the cover parts. Underneath of the lines a lifting device is arranged in each case for the cyclic lifting of a cover magazine always by the thickness of a cover part, together with an endless pressure and transport link conveyor with grooved links, complementing each other to form a guide belt for the ball core. The links are connected with each other by means of a conveyor belt extending transversely to the link conveyor of the first covering table and at a distance corresponding to the thickness of the ball core parallel under the like conveyor of the second covering table. The velocities of the transport conveyor and the link conveyor of the second covering line are correlated so that the partially covered ball core, as the consequence of the resultant movement effected by the two different revolving velocities, is rotated by 270° in the forward direction or by 90° in the rearward direction, prior to reaching the magazine of the second covering line.

With the aid of this embodiment of a covering apparatus, the continuous covering of playing balls may be effected again in a fully automatic on-line operation wherein the passing sequence is determined only the the time required for the lifting of the cover part magazine after the passage of each ball core.

To assure an adequate contact surface pressure of the ball cores against the cover parts even in the lower range of the magazine in which the stack of cover parts has only a slight inherent flexibility, the lifting device is advantageously equipped with an elastically yielding or flexible cover.

BRIEF DESCRIPTION OF THE DRAWING

The invention will become more apparent from the examples in the drawing.

In the drawing.

DETAILED DESCRIPTION OF THE PREFERRED EMBODIMENTS

Figure 1:
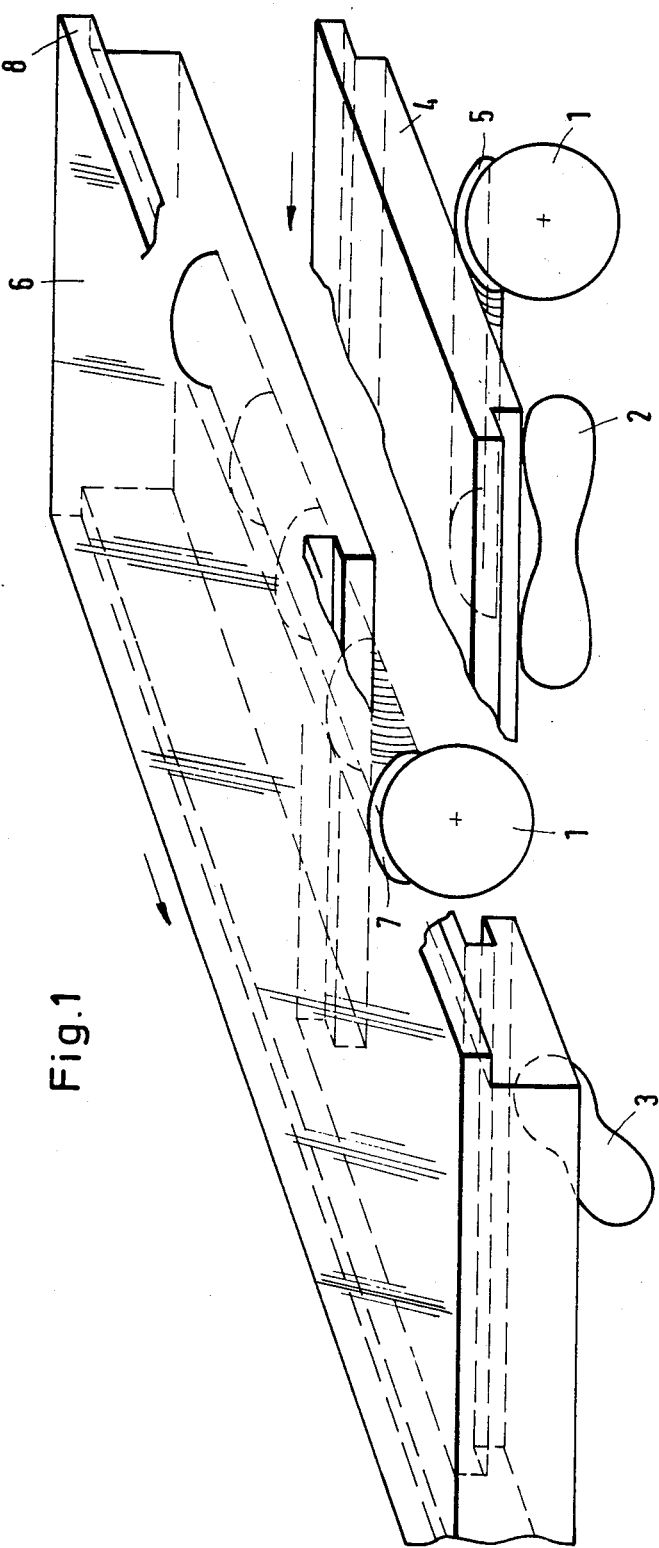
FIG. 1 shows in a perspective view a diagram of a covering apparatus for cyclic operation.

In the drawing, 1 designates a ball core and 2, 3 the dumbbell-shaped cover parts which, while interlocking at an angle of 90°, are to be applied by the rolling of the glue covered ball core over the laid out cover parts to the ball core. In FIG. 1 of the drawing, only one of the dumbbell-shaped cover parts 2, 3 is shown schematically. It is to be understood that in place of the individually represented dumbbell-shaped cover parts, a magazine of cover parts is always provided.

A slide 4 is located over the work table as a first pressure device. The pressure device is equipped with a spherically arching contact and guide channel 5 extends longitudinally over the magazine of the cover parts 2 and the corresponding table opening is displaceable in the direction of the longitudinal axis of the cover part magazine opening. This direction is defined in the drawing as the "1st direction of movement". In addition to the slide 4, another slide 6, again with a contact and guide channel 7, is provided which may be moved back and forth in a direction offset by 90° with respect to the slide 4 with the guide channel extending longitudinally over the magazine of the cover parts 3. The first slide 4 may be guided in the slide 6 and the latter in a guide 8 mounted on the table or both slides may be guided separately in a guide attached to the table.

Figure 2:
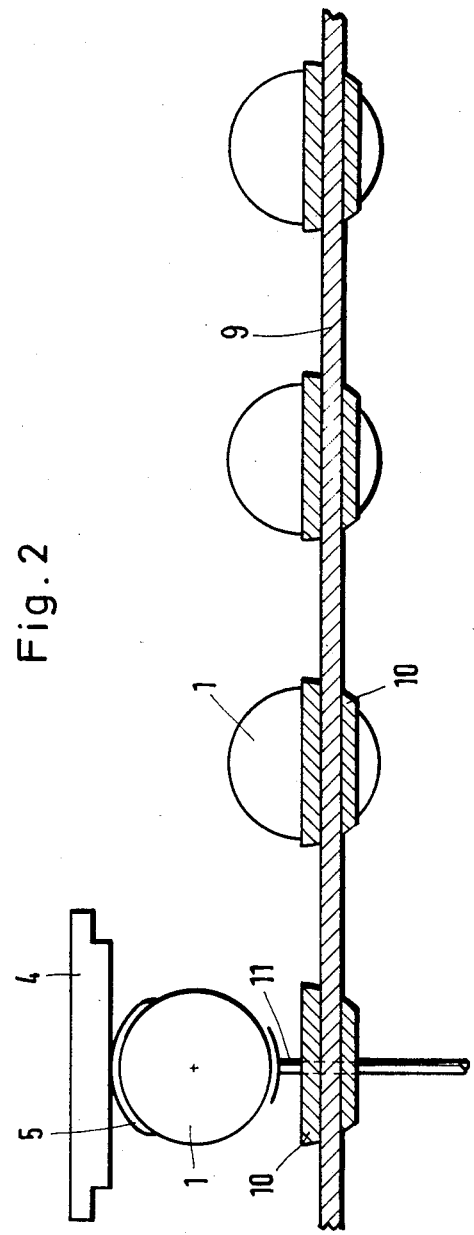
FIG. 2 illustrates a ball core feeder device in a schematic lateral elevation.

In FIG. 2 of the drawing, in which identical parts are designated by identical reference symbols, the symbol 9 identifies a conveyor belt equipped with cups 10 open in the downward direction whereby the ball cores 1 may be moved individually within the range of the first slide 4. A lift disk 11 is located under the conveyor belt within the range of the slide 4 whereby through the open cup 10, the ball core 1 may be raised and placed into contact with the slide 4 and the guide channel 5.

Figure 3:
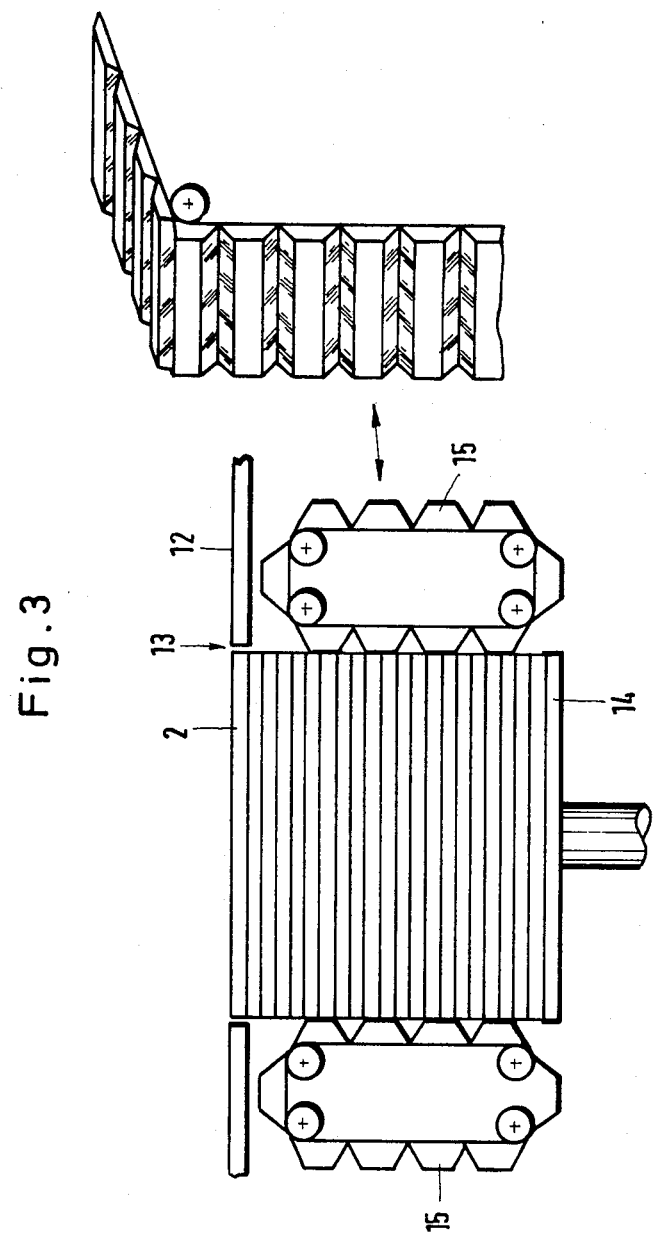
FIG. 3 shows a lifting device for a cover part magazine in a schematic lateral elevation.

In FIG. 3 of the drawing, 12 designates the work table of the apparatus wherein an opening 13 corresponding to the outline of the cover parts is provided. A magazine carrier 14 is arranged under the opening 13. With the aid of a lifting device, the magazine carrier may be raised successively always by the thickness of a cover part so that the uppermost cover part 2 is always in the plane of the work table. In the case shown, the lifting device consists of a lifting disk 14 with two link conveyor belts 15 guiding the magazine on opposing lateral surfaces. However, any other suitable lifting and guide device may be employed.

To cover the ball, the ball core is transported first with the aid of the transport belt 9 in the range of the slide 4 and lifted by means ofthe lift disk 11 until the ball core is in contact with the guide channel 5. Subsequently, the slide 4 (see FIG. 1) is displaced in the first direction of movement, whereby the ball core 1 is rolled on the work table over the cover part magazine 2 from which it takes the uppermost part by virtue of the adhesive layer on its surface. By means of the corresponding advance of the slide 4, the now partially covered ball core leaves the slide 4 and arrives in the range of the guide channel 7 where it is seized and rolled by means of the motion of the slide 6 in the second direction of motion over the second cover part magazine 3, from which it takes in a similar manner the uppermost cover, while adhesively bonding it. The paths of the movements and their distances are correlated so that the two dumbbell-shaped cover parts are applied interlocking at an angle of 90° and a looping seam typical of this type of covered balls, is formed. The covering process is thereby completed and the slides are returned into their starting position for the transfer and covering of the next ball core.

Figure 4:
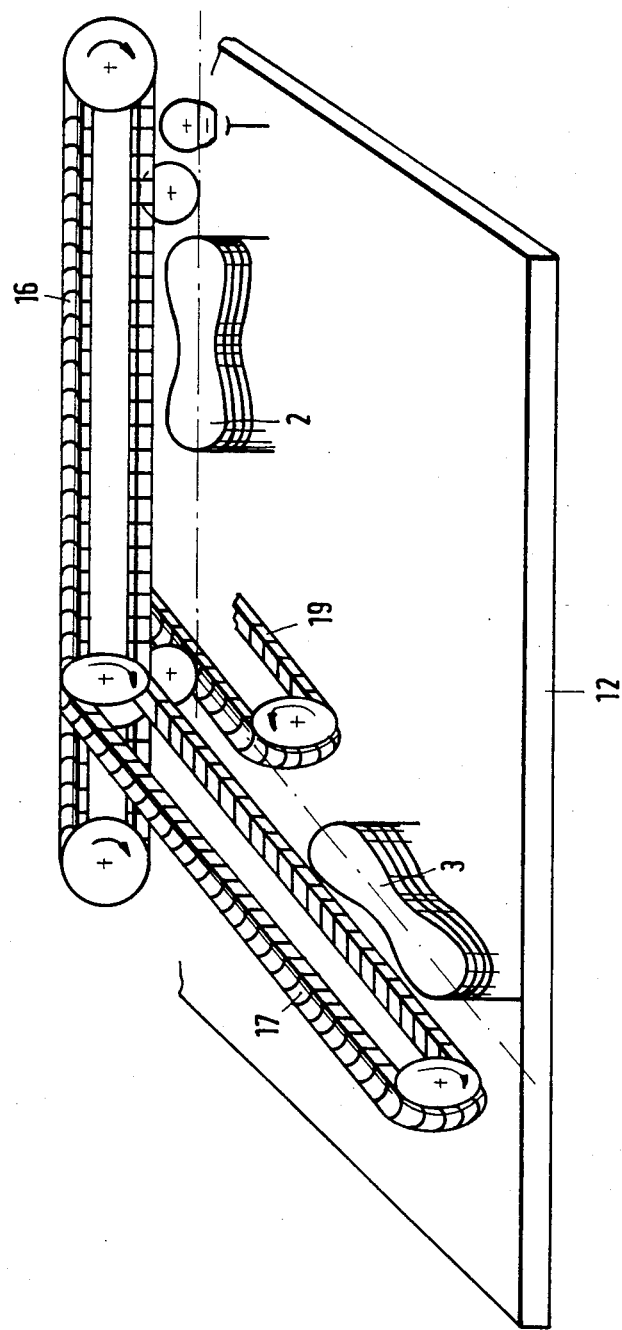
FIG. 4 represents a sechematic perspective view of a covering apparatus for continuous on-line operation.
Figure 5:
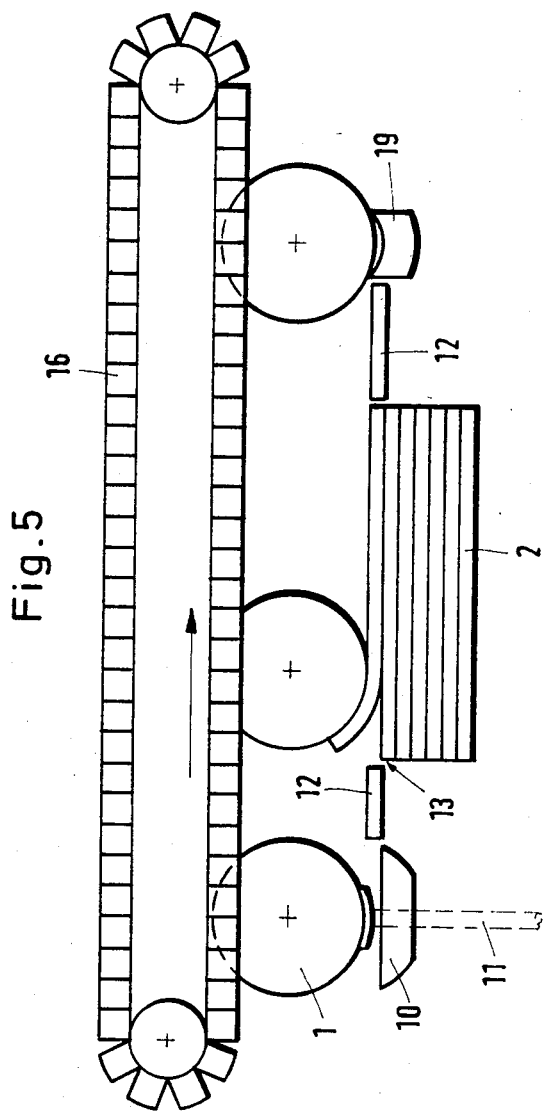
FIG. 5 shows a schematic lateral elevation of the first covering table of the apparatus shown in FIG. 4.

In the embodiment shown in FIGS. 4 and 5 and suitable for on-line operation, again a covering table 12 is provided with a lifting device for the successive raising of a cover part magazine always by the thickness of a cover part arranged underneath. The contact pressure device in this case comprises a link belt 16 and 17 with grooved links complementing each other to form a guide belt for the ball core. The links are connected with each other by means of a conveyor belt 19 extending transversely to the link belt 16 of the first covering line and passing at a distance corresponding to the thickness of the ball parallel under the link belt of the second covering line. The velocities of the conveyor belt 19 and the link belt 17 of the second covering line are correlated. The correlation is so that the partially covered ball core is rotated by the action of the resultant motion effected by the two different revolving velocities, prior to reaching the magazine of the second covering line by approximately 270° in the forward direction or 90° in the rearward direction. The front edge of the cover part is thereby joined with a visual seam gap to the bight edge of the cover part already in position. With the aid of this covering apparatus, the continuous covering of the balls with a short time sequence and without interruption due to the necessary return of the apparatus into its original position is possible.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A process for the covering of playing balls comprising:
   (a) stacking dumbell-shaped cover members in two separate magazines;
   (b) applying adhesive to the peripheral surfaces of said cover members;
   (c) supplying a plurality of ball cores successively by moving said ball cores in a conveyor having a plurality of cup-shaped openings and lifting said ball cores from said cup-shaped openings into a path including the length of said cover members;
   (d) rolling said ball cores successively over the first of said magazines along said path including the length of said cover members and for a distance equal to one and one-fourth times the length of said cover member to apply a first cover member to each ball core;
   (e) rolling the ball cores after step d in a direction transverse to said path for a distance equal to about three-fourths the circumference of each ball; and
   (f) rolling the ball cores after step e over the second of said magazines to apply a second cover member to each ball core at an angle of 90° to the first cover member and form a decorative seam gap between said first and second cover members.

2. The process of claim 1, wherein the edges of the second cover member engage the edges of the first cover member.

3. The process of claim 1, wherein adhesive is applied to the peripheral surfaces of the cover members by immersing the magazine of stacked cover members into an adhesive bath.

4. The process of claim 1 including applying adhesive to the ball cores prior to rolling over the first of said magazines.

5. The process of claim 1, wherein said rolling steps are conducted by applying continuous pressure to the ball cores in a longitudinal direction.

6. The process of claim 1, wherein the ball cores are tennis ball cores and the cover members are tennis ball covers.

7. An apparatus for the covering of playing balls comprising:
   a work surface;
   a first rolling line on said work surface;
   a second rolling line on said work surface at an angle of 90° to said first work surface;
   an opening in the work surface at each of said rolling lines;
   a magazine arranged in each of said openings, said magazine holding a plurality of cover members;
   means for successively lifting the contents of each magazine into the rolling line a distance equal to the thickness of one over member;
   a feeder conveyor equipped with cups open in the downward direction for receving ball cores;
   means for guiding the ball cores to be covered along said first and second rolling lines, said guiding means including two link belts, the first link belt being arranged above said first rolling line and the second link belt being arranged above said second rolling line, each link belt comprising an endless contact pressure and transport belt with grooved links complementing each other to form a guide belt for the ball cores; and
   raising means under said guiding means for raising said ball cores from said feeder conveyor into contact with said guiding means.

8. The apparatus of claim 7, wherein said magazines in said first and second rolling lines are distanced such that a ball core rolls along said first rolling line across said first magazine plus a distance equal to one-half the length of said cover part then along said second rolling line to said second magazine at a distance of about three-fourths the length of said cover member.

9. The apparatus of claim 7, wherein said table is a flat table.

10. The apparatus of claim 7, wherein said links are connected with each other by means of a conveyor belt extending transversely to the link belt of the first rolling line and passing at a distance corresponding to the thickness of the ball parallel under the link belt of the second rolling line.

11. The apparatus of claim 10, further comprising means for moving said conveyor belts at a velocity to produce a rotating motion of the ball core of about 270° in the forward direction or 90° in the rearward direction prior to reaching the leading edge of said second magazine.

12. The apparatus of claim 7, wherein said means for successively lifting is covered with an elastically yielding covering.

13. The apparatus of claim 7, wherein said lifting means comprises a lifting disk and two link conveyor belts guiding each magazine on opposite sides of each magazine.

* * * * *